United States Patent
Ohta et al.

(10) Patent No.: US 10,448,302 B2
(45) Date of Patent: Oct. 15, 2019

(54) WIRELESS COMMUNICATIONS APPARATUS, WIRELESS COMMUNICATIONS SYSTEM, AND WIRELESS COMMUNICATIONS METHOD

(71) Applicant: FUJITSU LIMITED, Kawasaki-shi, Kanagawa (JP)

(72) Inventors: Yoshiaki Ohta, Yokohama (JP); Tetsuya Yano, Yokohama (JP); Shinichiro Aikawa, Yokohama (JP); Takayoshi Ode, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 11 days.

(21) Appl. No.: 15/797,619

(22) Filed: Oct. 30, 2017

(65) Prior Publication Data
US 2018/0054768 A1    Feb. 22, 2018

Related U.S. Application Data

(63) Continuation of application No. PCT/JP2015/063952, filed on May 14, 2015.

(51) Int. Cl.
*H04W 4/00* (2018.01)
*H04W 36/24* (2009.01)
(Continued)

(52) U.S. Cl.
CPC ..... *H04W 36/245* (2013.01); *H04W 36/0055* (2013.01); *H04W 36/0083* (2013.01);
(Continued)

(58) Field of Classification Search
CPC ... H04W 36/245; H04W 48/12; H04W 48/20; H04W 36/0083; H04W 36/0055;
(Continued)

(56) References Cited

U.S. PATENT DOCUMENTS

2005/0245260 A1* 11/2005 Nielsen .............. H04W 48/20
455/435.1
2009/0270104 A1* 10/2009 Du ...................... H04W 48/02
455/436
(Continued)

FOREIGN PATENT DOCUMENTS

JP   2013-520100 A   5/2013
JP   2014-11548 A    1/2014
(Continued)

OTHER PUBLICATIONS

3GPP TS 36.300 V12.5.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Mar. 2015.
(Continued)

Primary Examiner — Clemence S Han
(74) Attorney, Agent, or Firm — Myers Wolin, LLC.

(57) ABSTRACT

A wireless communications apparatus includes a control unit configured to establish a connection with a first cell formed by another wireless communications apparatus, the control unit performing selection or reselection of a second cell different from the first cell, according to a value of control information corresponding to a degree of connection barring of at least one or more cells, when the connection with the first cell is barred. The wireless communications apparatus camps on the second cell, not on the first cell when the control unit performs the selection or reselection of the second cell.

8 Claims, 13 Drawing Sheets

(51) Int. Cl.
H04W 36/22 (2009.01)
H04W 36/00 (2009.01)
H04W 48/20 (2009.01)
H04W 48/12 (2009.01)
H04W 48/06 (2009.01)
H04W 36/08 (2009.01)
H04W 36/36 (2009.01)

(52) U.S. Cl.
CPC .......... *H04W 36/22* (2013.01); *H04W 48/12* (2013.01); *H04W 48/20* (2013.01); *H04W 36/08* (2013.01); *H04W 36/36* (2013.01); *H04W 48/06* (2013.01)

(58) Field of Classification Search
CPC ..... H04W 36/22; H04W 36/36; H04W 36/08; H04W 48/06
See application file for complete search history.

(56) References Cited

U.S. PATENT DOCUMENTS

| | | | |
|---|---|---|---|
| 2010/0056172 A1 | 3/2010 | Iwamura et al. | |
| 2010/0291941 A1* | 11/2010 | Chen ..................... | H04W 36/22 455/450 |
| 2010/0291956 A1 | 11/2010 | Iwamura et al. | |
| 2011/0199905 A1* | 8/2011 | Pinheiro ........... | H04W 28/0215 370/235 |
| 2013/0109381 A1* | 5/2013 | Takahashi ............. | H04W 48/12 455/435.1 |
| 2013/0286829 A1* | 10/2013 | Ishii .................. | H04W 28/0205 370/230 |
| 2014/0148169 A1* | 5/2014 | Li ..................... | H04W 36/0061 455/437 |
| 2014/0307621 A1* | 10/2014 | Frenger ................... | H04W 4/70 370/328 |
| 2015/0195756 A1* | 7/2015 | Fukumoto ............. | H04W 48/16 370/230 |
| 2015/0264618 A1* | 9/2015 | Jung ..................... | H04W 48/20 455/436 |
| 2016/0150506 A1* | 5/2016 | Tabet .................... | H04W 48/20 370/329 |
| 2017/0135024 A1* | 5/2017 | Burbidge .............. | H04W 48/02 |
| 2017/0135028 A1* | 5/2017 | Lee ........................ | H04W 48/16 |
| 2017/0366995 A1* | 12/2017 | Jung ..................... | H04W 24/10 |

FOREIGN PATENT DOCUMENTS

| | | |
|---|---|---|
| JP | 2014-78917 A | 5/2014 |
| WO | 2008/023609 A1 | 2/2008 |
| WO | 2008/023611 A1 | 2/2008 |

OTHER PUBLICATIONS

3GPP TS 36.304 V12.4.0, "3rd Generation Partnership Project; Technical Specification Group Radio Access Network; Evolved Universal Terrestrial Radio Access (E-UTRA); User Equipment (UE) procedures in idle mode (Release 12)", Mar. 2015.
3GPP TS 36.211 V12.5.0, "3rd Generation Partnership Project; Technical Specification Group Radio Access Network; Evolved Universal Terrestrial Radio Access (E-UTRA); Physical channels and modulation (Release 12)", Mar. 2015.
3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)", Mar. 2015.
3GPP TS 36.213 V12.5.0, "3rd Generation Partnership Project; Technical Specification Group Radio Access Network; Evolved Universal Terrestrial Radio Access (E-UTRA); Physical layer procedures (Release 12)", Mar. 2015.
3GPP TS 36.321 V12.5.0, "3rd Generation Partnership Project; Technical Specification Group Radio Access Network; Evolved Universal Terrestrial Radio Access (E-UTRA); Medium Access Control (MAC) protocol specification (Release 12)", Mar. 2015.
3GPP TS 36.322 V12.2.0, "3rd Generation Partnership Project; Technical Specification Group Radio Access Network; Evolved Universal Terrestrial Radio Access (E-UTRA); Radio Link Control (RLC) protocol specification (Release 12)", Mar. 2015.
3GPP TS 36.323 V12.3.0, "3rd Generation Partnership Project; Technical Specification Group Radio Access Network; Evolved Universal Terrestrial Radio Access (E-UTRA); Packet Data Convergence Protocol (PDCP) specification (Release 12)", Mar. 2015.
3GPP TS 36.331 V12.5.0, "3rd Generation Partnership Project; Technical Specification Group Radio Access Network; Evolved Universal Terrestrial Radio Access (E-UTRA); Radio Resource Control (RRC); Protocol specification (Release 12)", Mar. 2015.
3GPP TS 36.413 V12.5.0, "3rd Generation Partnership Project; Technical Specification Group Radio Access Network; Evolved Universal Terrestrial Radio Access Network (E-UTRAN); S1 Application Protocol (S1AP) (Release 12)", Mar. 2015.
3GPP TS 36.423 V12.5.0, "3rd Generation Partnership Project; Technical Specification Group Radio Access Network; Evolved Universal Terrestrial Radio Access Network (E-UTRAN); X2 application protocol (X2AP) (Release 12)", Mar. 2015.
3GPP TS 36.425 V12.1.0, "3rd Generation Partnership Project; Technical Specification Group Radio Access Network; Evolved Universal Terrestrial Radio Access Network (E-UTRAN); X2 interface user plane protocol (Release 12)", Mar. 2015.
3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)", Dec. 2013.
Verizon et al., "New WI proposal for Multicarrier Load Distribution of UEs in LTE," Agenda Item: 14.1.2, 3GPP TSG RAN Meeting #67, RP-150491 (revision of RP-150446, RP-150200), Shanghai, China, Mar. 9-12, 2015.
3GPP TS 25.304 V12.5.0, "3rd Generation Partnership Project; Technical Specification Group Radio Access Network; User Equipment (UE) procedures in idle mode and procedures for cell reselection in connected mode (Release 12)", Mar. 2015.
Alcatel-Lucent et al., "Idle UE Distribution in Macro Only System and HetNets", Agenda Item: 7.11.1, 3GPP TSG-RAN WG2 Meeting #86, R2-142495, Seoul, South Korea, May 19-23, 2014.
Ericsson et al., "Cell-specific prioritization for idle mode load balancing", Agenda Item: 7.11.1, 3GPP TSG-RAN WG2 #86 Tdoc R2-142530, Seoul, South Korea, May 19-23, 2014.
International Search Report issued for corresponding International Patent Application No. PCT/JP2015/063952, dated Aug. 4, 2015.
International Preliminary Report on Patentability for corresponding International Patent Application No. PCT/JP2015/063952 dated Aug. 4, 2015, with partial English translation.
Notification of Reasons for Refusal issued by the Japan Patent Office for corresponding Japanese Patent Application No. 2017-517578, dated Aug. 28, 2018, with an English translation.

* cited by examiner

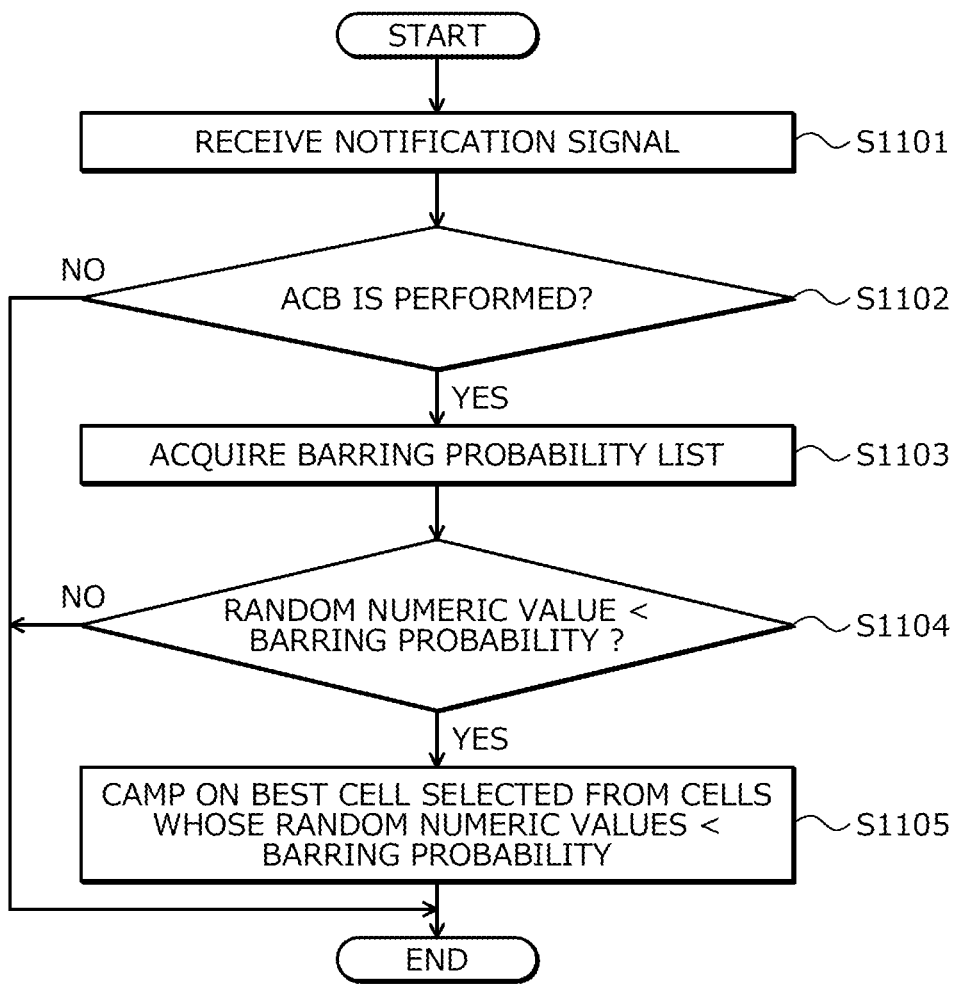

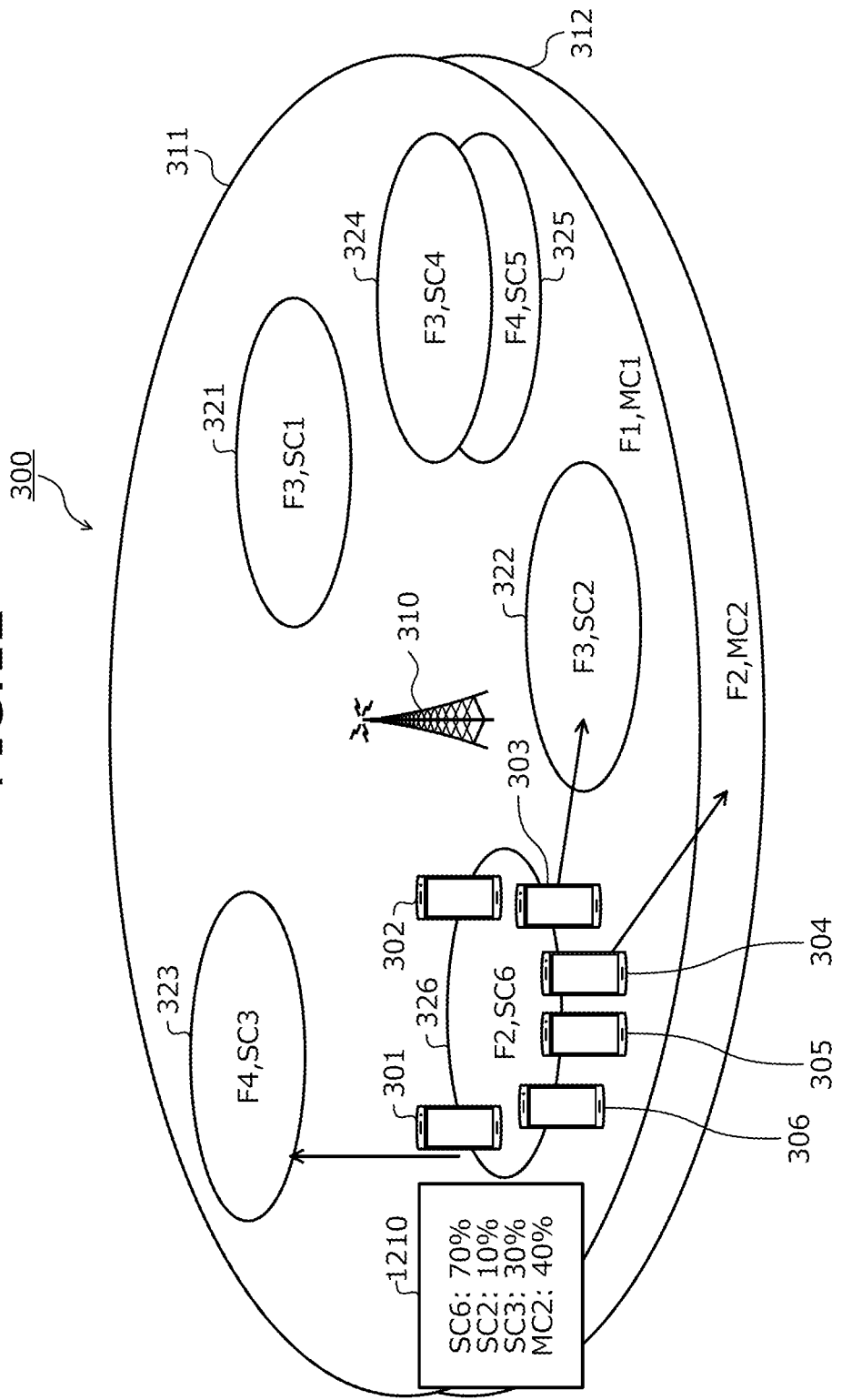

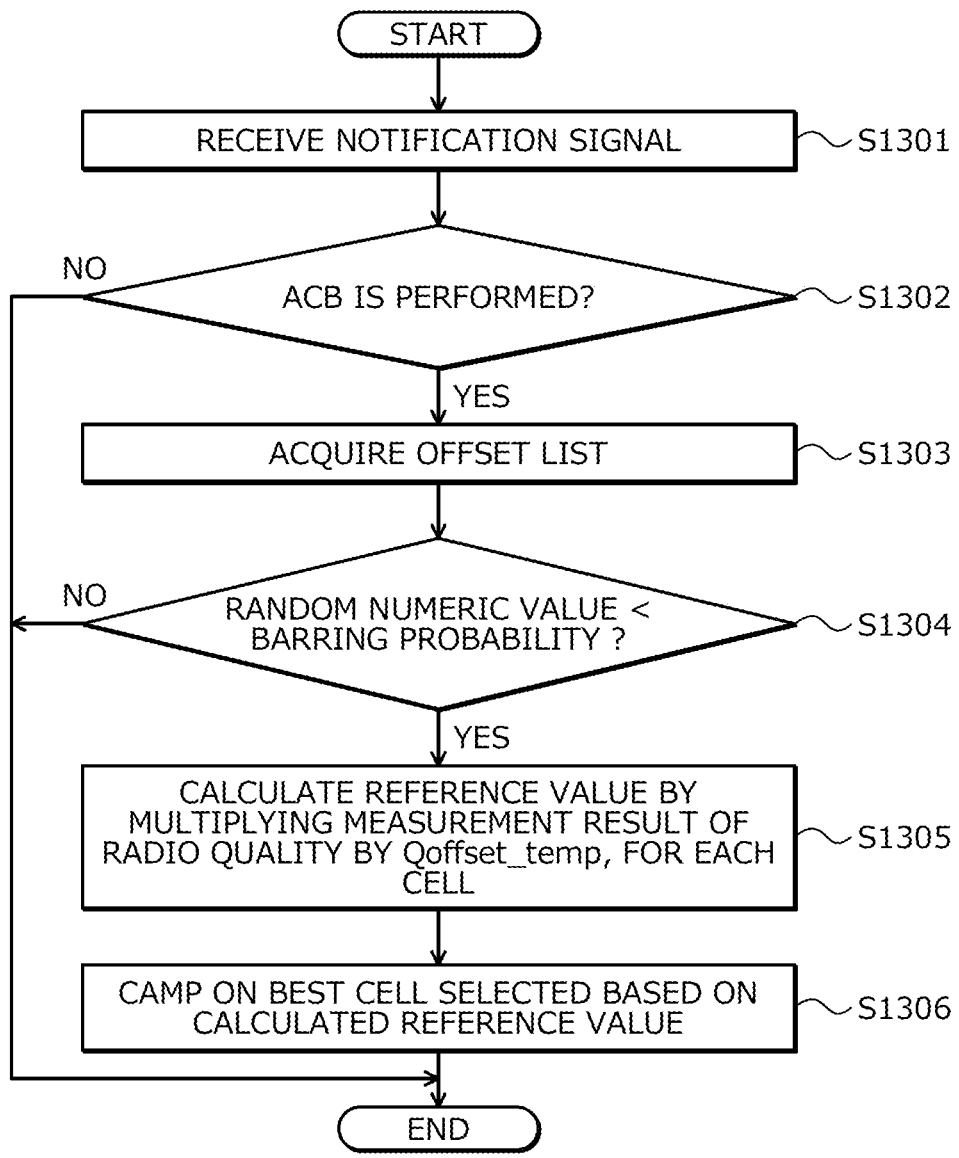

WIRELESS COMMUNICATIONS APPARATUS, WIRELESS COMMUNICATIONS SYSTEM, AND WIRELESS COMMUNICATIONS METHOD

CROSS REFERENCE TO RELATED APPLICATIONS

This application is a continuation application of International Application PCT/JP2015/063952, filed on May 14, 2015, and designating the U.S., the entire contents of which are incorporated herein by reference.

FIELD

The embodiments discussed herein relate to a wireless communications apparatus, a wireless communications system, and a wireless communications method.

BACKGROUND

Conventionally, mobile communication such as long term evolution (LTE) specified by the Third Generation Partnership Project (3GPP) is known (see, e.g., 3GPP TS36.300 V12.5.0, March 2015; 3GPP TS36.304 V12.4.0, March 2015; 3GPP TS36.211 V12.5.0, March 2015; 3GPP TS36.212 V12.4.0, March 2015; 3GPP TS36.213 V12.5.0, March 2015; 3GPP TS36.321 V12.5.0, March 2015; 3GPP TS36.322 V12.2.0, March 2015; 3GPP TS36.323 V12.3.0, March 2015; 3GPP TS36.331 V12.5.0, March 2015; 3GPP TS36.413 V12.5.0, March 2015; 3GPP TS36.423 V12.5.0, March 2015; 3GPP TS36.425 V12.1.0, March 2015; 3GPP TR36.842 V12.0.0, December 2013; 3GPP RP-150491, March 2015; 3GPP TS25.304 V12.5.0, March 2015). According to a known technique, a selection probability or priority is configured for each cell formed by a base station and the load is thereby distributed among the cells (see, e.g., 3GPP R2-142495, May 2014 and 3GPP R2-142530, May 2014).

According to another known technique, a base station informs a mobile station of a selection probability for the mobile station to select a pre-selected cell to be accessed when the mobile station transitions from an idle state to an active state, and the mobile station selects the pre-selected cell based on selection information and performs line configuration (see, e.g., WO 2008/023609).

According to another known technique, a base station operating plural cells each having a predetermined bandwidth measures the traffic state in each of the cells, determines a cell to which a mobile station is to be moved, based on the measured traffic state, and notifies the mobile station of the determined cell by using a paging channel (see, e.g., WO 2008/023611).

SUMMARY

According to an aspect of an embodiment, a wireless communications apparatus includes a control unit configured to establish a connection with a first cell formed by another wireless communications apparatus, the control unit performing selection or reselection of a second cell different from the first cell, according to a value of control information corresponding to a degree of connection barring of at least one or more cells, when the connection with the first cell is barred. The wireless communications apparatus camps on the second cell, not on the first cell when the control unit performs the selection or reselection of the second cell.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a flowchart of an example of a process by the terminal according to the second embodiment;

FIG. 12 is a diagram of an example of cell reselection in a wireless communications system according to a third embodiment; and FIG. 13 is a flowchart of another example of a process executed by a terminal according to the third embodiment.

DESCRIPTION OF THE INVENTION

With conventional techniques, a system is significantly affected because selection probability or priority has to be configured for cells to resolve, for example, load imbalances between the cells. Therefore, in some cases, impact on the system cannot be suppressed and the load imbalances between the cells cannot be resolved.

Embodiments of a wireless communications apparatus, a wireless communications system, and a wireless communications method according to the present invention will be described in detail with reference to the accompanying drawings.

Figure 1:
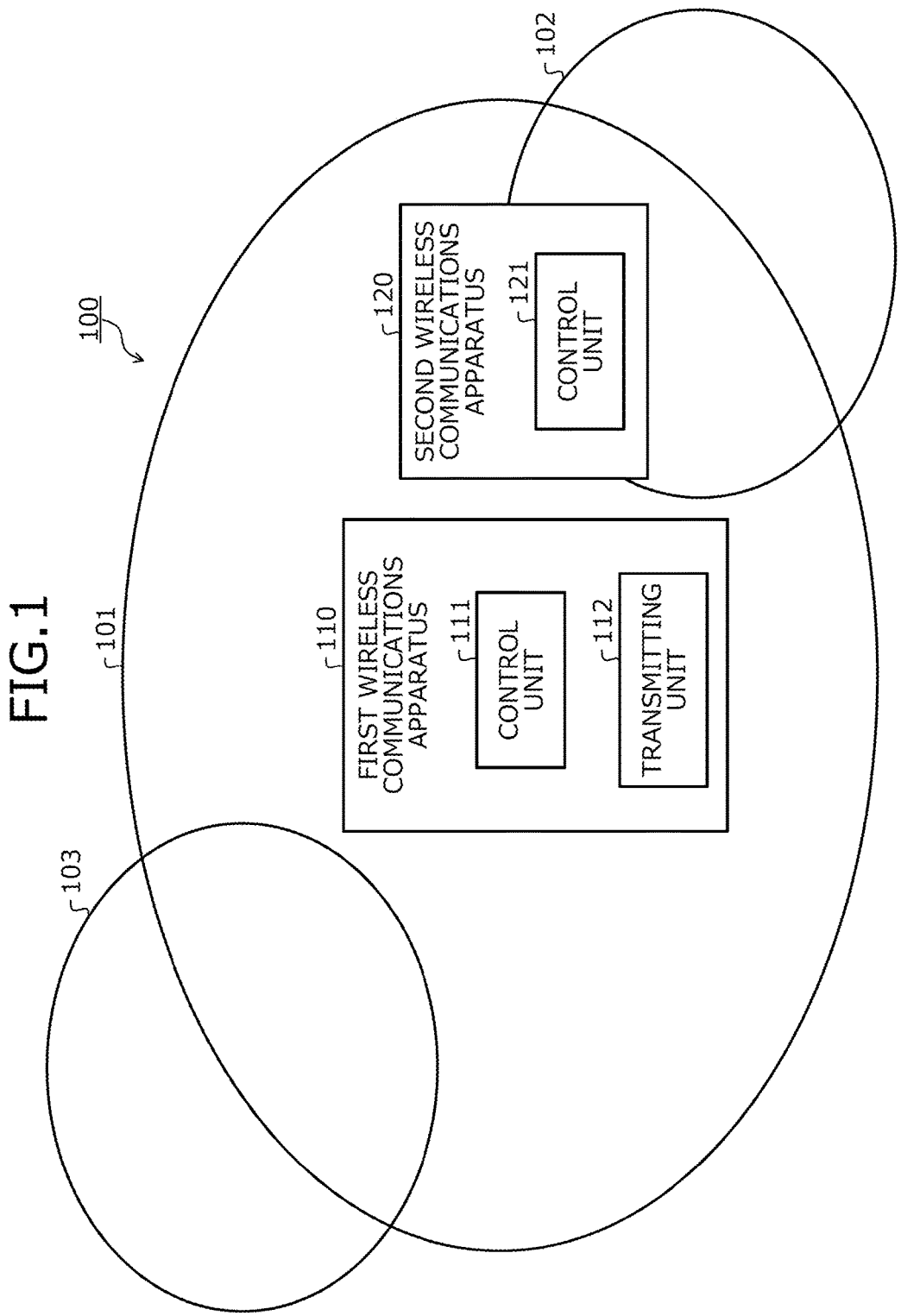
FIG. 1 is a diagram of an example of a wireless communications system according to a first embodiment.

FIG. 1 is a diagram of an example of a wireless communications system according to a first embodiment. As depicted in FIG. 1, a wireless communications system 100 according to the first embodiment includes a first wireless communications apparatus 110 and a second wireless communications apparatus 120.

The first wireless communications apparatus 110 forms a first cell 101. For example, the first wireless communications apparatus 110 is a base station capable of communicating wirelessly with a terminal in the first cell 101. The first wireless communications apparatus 110 bars connection to the first cell 101 according to, for example, the load state in the first cell 101.

The first wireless communications apparatus 110 includes a control unit 111 and a transmitting unit 112. The control unit 111 controls the barring of connection to the first cell 101 formed by the first wireless communications apparatus 110. For example, the control unit 111 bars connection to the first cell 101 by configuring a barring probability and a connection barring time period for the first wireless communications apparatus 110.

The barring probability is, for example, a value to be compared with a random numeric value calculated by a terminal for the terminal to determine whether the terminal is to be barred. In other words, the terminal compares, for the cell that is to be the connection destination, the barring probability of the cell with the random numeric value calculated by the terminal to determine whether the terminal is to be barred based on the comparison result. When the terminal determines that the terminal is to be barred, the terminal restricts communication between the cell and the terminal.

The connection barring time period is, for example, a value to calculate a time period to restrict the communication between the cell and the terminal when the terminal determines that the terminal is to be barred. For example, when the terminal determines that the terminal is to be barred, the terminal calculates the connection barring time period using a probability of a distribution for which the average value is the connection barring time period, and restricts communication between the cell and the terminal for the calculated connection barring time period.

The transmitting unit 112 acquires control information that corresponds to the degree of connection barring in at least one or more cells. The transmitting unit 112 transmits a notification signal that includes the acquired control information. The notification signal is information that can be received by the terminals in, for example, the first cell 101.

The at least one or more cells include, for example, a cell different from the first cell 101. For example, the at least one or more cells include a second cell 102 different from the first cell 101. The second cell 102 is a cell to which the second wireless communications apparatus 120 can connect. The at least one or more cells may include a third cell 103 to which the second wireless communications apparatus 120 cannot connect. The second cell 102 and the third cell 103 may be cells formed by the same base station as that of the first cell 101.

The control information corresponding to the degree of connection barring includes, for example, the barring probability of the connection barring. Alternatively, the control information corresponding to the degree of connection barring may include a connection barring time period of the connection barring. Alternatively, the control information corresponding to the degree of connection barring may include both the barring probability and the connection barring time period.

Alternatively, the control information corresponding to the degree of connection barring may include an offset value that is a reference value calculated for each of the cells for selection of a cell or for reselection of a cell; the offset value is a value that is relative to a reference value based on the result of the measurement of the radio quality of each cell. Alternatively, the control information corresponding to the degree of connection barring may include both or at least one of the barring probability and the connection barring time period, and the offset value.

The first wireless communications apparatus 110 can thereby notify the second wireless communications apparatus 120 of the control information corresponding to the degree of connection barring in at least one or more cells. The first wireless communications apparatus 110 may not include any control information indicating the degree of connection barring in the notification signal for, for example, a cell for which no connection barring is imposed among the at least one or more cells (for example, a cell whose degree of connection barring is zero). In this case, the second wireless communications apparatus 120 determines that no barring is imposed on connection (for example, the degree of connection barring is zero) in cells whose control information is not included in the notification signal.

The second wireless communications apparatus 120 is connected to the first cell 101 formed by the first wireless communications apparatus 110. The second wireless communications apparatus 120 is, for example, a terminal that can communicate wirelessly with a base station. The second wireless communications apparatus 120 includes a control unit 121.

When the first wireless communications apparatus 110 bars connection to the first cell 101, the control unit 121 executes selection or reselection of the second cell 102 that is different from the first cell 101, according to the value of the control information corresponding to the degree of connection barring in at least one or more cells. The control information can be acquired by, for example, the notification signal from the first wireless communications apparatus 110.

The selection of the second cell 102 is, for example, cell selection to select a cell to be a connection destination. The reselection of the second cell 102 is, for example, cell reselection to reselect a cell to be a connection destination. When the control unit 121 executes the selection or the reselection of the second cell 102, the second wireless communications apparatus 120 camps on the second cell 102, not on the first cell 101. Camping on a cell refers to, for example, a wireless communications apparatus executing registration of non access stratum (NAS) for a cell and being able use the services by the cell. The second wireless communications apparatus 120 switches the connection destination from the first cell 101 to the second cell 102.

In this manner, the second wireless communications apparatus 120 according to the first embodiment executes the selection or the reselection of the second cell 102 according to the value of the control information corresponding to the degree of connection barring in each of the at least one or more cells when connection to the first cell 101 as the connection destination is barred. When the second wireless communications apparatus 120 executes the selection or the reselection of the second cell 102, the second wireless communications apparatus 120 camps on the second cell 102, not on the first cell 101.

Switching from the first cell 101 whose connection is barred is thereby executed to the second cell 102, and the load can be reduced on the first cell 101 whose connection is barred and load imbalances between the cells can be resolved. Impact on the system can be suppressed because load imbalances between the cells can be resolved even without configuring, for example, the selection probability or the priority for each cell by executing the selection or the reselection of the second cell 102 using the value of the control information corresponding to the degree of connection barring.

Details of the wireless communications system 100 according to the first embodiment depicted in FIG. 1 will be described with reference to second and third embodiments.

The second and third embodiments can be understood as Examples that each embody the first embodiment and therefore, can each be implemented in combination with the first embodiment.

Figure 2:
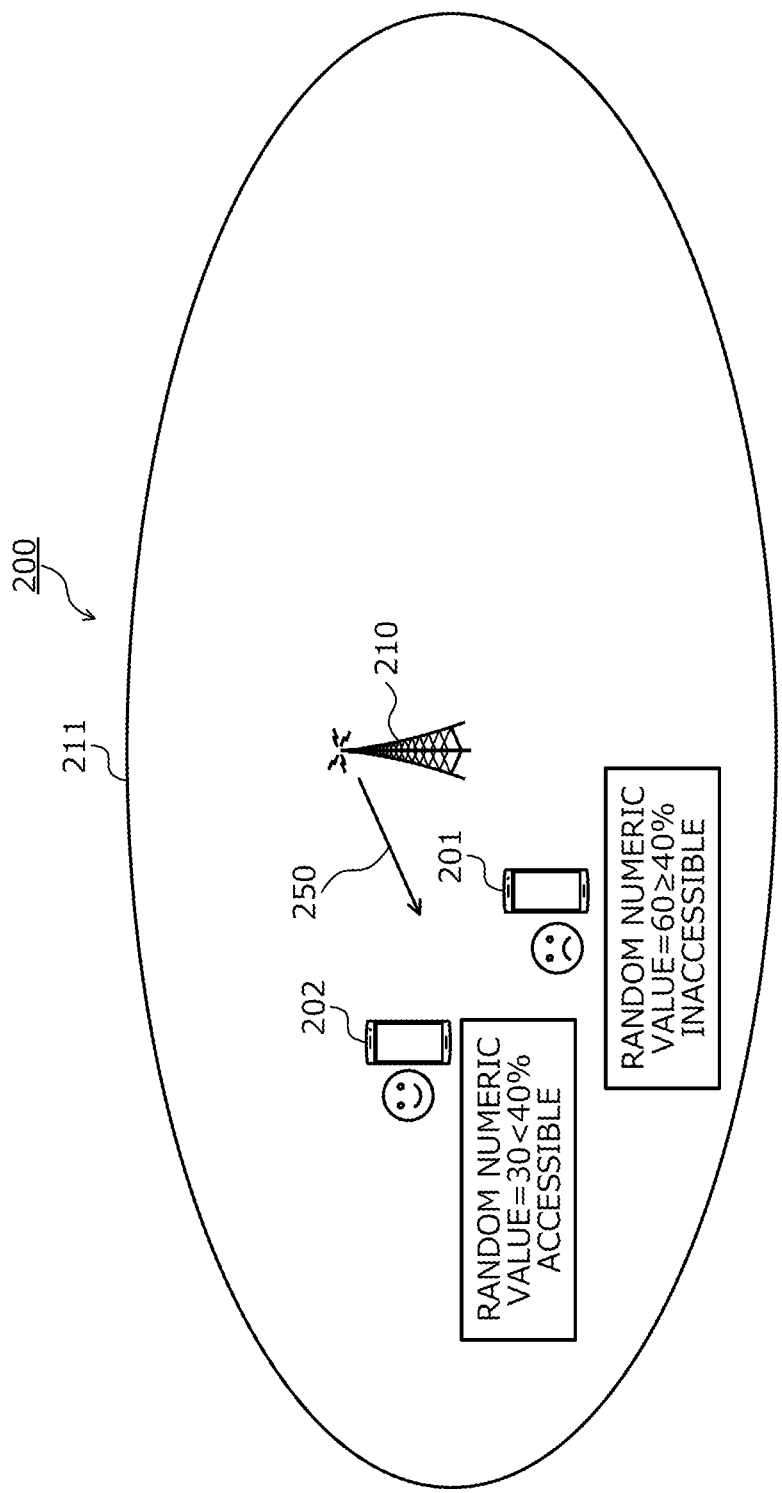
FIG. 2 is a diagram of an example of access class barring applicable to a wireless communications system according to a second embodiment.

FIG. 2 is a diagram of an example of access class barring applicable to the wireless communications system according to the second embodiment. As depicted in FIG. 2, a wireless communications system 200 according to the second embodiment includes a base station 210 and terminals 201 and 202. This embodiment can also be understood as Example that further embodies the first embodiment and can therefore be implemented in combination with the first embodiment.

Various types of base stations such as, for example, an evolved Node B (eNB) specified by the 3GPP are applicable to the base station 210. The base station 210 may be a macro base station forming a cell having a large coverage (a macro cell) or may be a small base station forming a cell having a small coverage (a small cell).

Various types of terminals such as, for example, user equipment (UE) specified by the 3GPP are each applicable to the terminals 201 and 202. The cell 211 is a cell formed by the base station 210. The terminals 201 and 202 are present in the cell 211 and can communicate wirelessly with the base station 210.

The base station 210 executes access class barring (ACB) to temporarily bar access to the cell 211 according to, for example, the state of the load of the cell 211. In the ACB, for example, transmission of data or transmission of the control signal from the terminals 201 and 202 can be barred. Alternatively, in the ACB, both the transmission of data and the transmission of the control signal can also be simultaneously barred from the terminals 201, 202.

When the base station 210 executes the ACB, the base station 210 stores a barring probability (ac-barring factor) and a connection barring time period (ac-barring time) in a notification signal 250 to be transmitted within the coverage of the cell 211. For example, the barring probability and the connection barring time period can be stored in a system information block (SIB) of the notification signal 250. The barring probability and the connection barring time period are configured according to, for example, the state of the load of the cell 211. For example, the barring probability is configured to be lower as the load of the cell 211 is larger. For example, the connection barring time period is configured to be longer as the load of the cell 211 is larger.

The barring probability is a probability for a terminal to determine whether the terminal is to be barred. For example, the barring probability can be configured in a range of 0 to 95%. The connection barring time period is a value for a terminal to calculate a time period during which transmission of data and transmission of a control signal are restricted when the terminal determines that the terminal is to be barred. For example, the connection barring time period can be configured to be any one of 4 seconds, 8 seconds, 16 seconds, . . . , 512 seconds.

The terminals 201 and 202 each acquire the barring probability and the connection barring time period notified by the base station 210 using the notification signal 250. Each of the terminals 201 and 202 calculates a random numeric value in the terminal and is to be barred when the calculated random numeric value is equal to or greater than the barring probability, and the transmission of data and the transmission of a control signal therefrom to the cell 211 are restricted. The terminals 201 and 202 are not to be barred when the calculated random numeric value is smaller than the barring probability, and the transmission of data and the transmission of control signals therefrom to the cell 211 are not restricted.

It is assumed in the example depicted in FIG. 2 that the barring probability notified by the base station 210 using the notification signal 250 for the cell 211 is 40%. It is also assumed that the random numeric values calculated by the terminals 201 and 202 are respectively 30% and 60%. In this case, the calculated random numeric value (30%) is lower than the barring probability (40%) for the terminal 201, the terminal 201 is therefore not to be barred, and the transmission of data and the transmission of a control signal therefrom to the cell 211 are not restricted (accessible). The calculated random numeric value (60%) is equal to or higher than the barring probability (40%) for the terminal 202, the terminal 202 is therefore to be barred and the transmission of data and the transmission of a control signal therefrom to the cell 211 are restricted (inaccessible).

Figure 3:
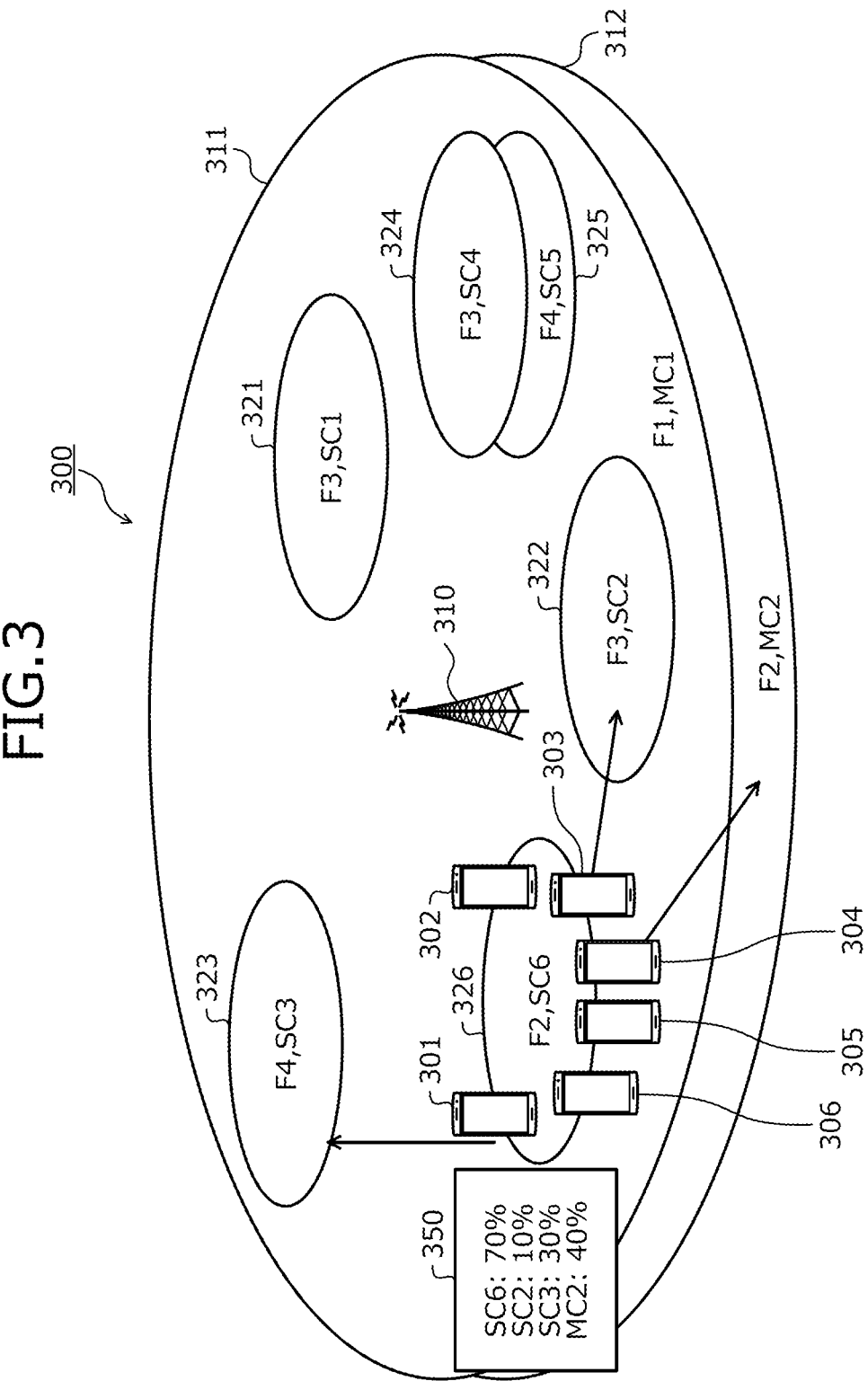
FIG. 3 is a diagram of an example of cell reselection in the wireless communications system according to the second embodiment.

FIG. 3 is a diagram of an example of cell reselection in the wireless communications system according to the second embodiment. A wireless communications system 300 according to the second embodiment depicted in FIG. 3 corresponds to the wireless communications system 200 depicted in FIG. 2. The wireless communications system 300 includes macro cells 311 and 312, small cells 321 to 326, and terminals 301 to 306.

The macro cells 311 and 312 (MC1 and MC2), and the small cells 321 to 326 (SC1 to SC6) each correspond to, for example, the cell 211 depicted in FIG. 2. The terminals 301 to 306 each correspond to, for example, the terminal 201 or the terminal 202 depicted in FIG. 2.

The macro cells 311 and 312 are cells whose frequencies are respectively frequencies of F1 and F2. The macro cell 311 is formed by a macro base station 310. The macro cell 312 is formed by the macro base station 310 or a macro base station different from the macro base station 310.

The small cells 321 to 326 are cells whose frequencies are respectively F3, F3, F4, F3, F4, and F2. The small cells 321 to 326 are each formed by a small base station.

In the example depicted in FIG. 3, a case will be described where the terminals 301 to 306 are connected to the small cell 326 and the ACB is executed in the small cell 326. In this case, the small cell 326 gives notification of a barring probability list 350 using a notification signal transmitted in the small cell 326.

The barring probability list 350 is information that indicates, in addition to the barring probability of the small cell 326 (the small cell 326), the barring probabilities of the small cells 322 and 323, and the macro cell 312 (another cell) that are neighbor cells of the small cell 326. The barring probability list 350 may further indicate the connection barring time periods in the small cells 322, 323, and 326, and the macro cell 312. In the example depicted in FIG. 3, the barring probabilities of the small cells 326, 322, and 323 (SC6, SC2, and SC3) and the macro cell 312 (MC2) are respectively 70%, 10%, 30%, and 40%.

For example, the base station forming the small cell 326 can generate the barring probability list 350 by collecting information that indicates the barring probabilities and the connection barring time periods from the base stations that form the small cells 322 and 323, and the macro cell 312. For example, an interface between base stations (for example, an X2 interface) between the small cell 326 and each of the other base stations can be used for the collection of the information that indicates the barring probability and the connection barring time period.

The terminals 301 to 306 each acquires the barring probability list 350 notified in the small cell 326. The terminals 301 to 306 each compares the calculated random numeric value and the barring probability (70%) in the small cell 326 by which the terminals 301 to 306 are currently connected with each other. It is assumed in the example depicted in FIG. 3 that the random numeric value is equal to or greater than the barring probability (70%) of the small cell 326 for each of the terminals 301, 303, and 304 among the terminals 301 to 306, and the terminals 301, 303, and 304 are to be barred.

In this case, the terminals 301, 303, and 304 to be barred each executes cell reselection to reselect a connection destination cell. At this time, the terminals 301, 303, and 304 each selects the best cell (Best Cell) by ranking candidate cells for the reselection based on the result of the measurement of the radio quality of each of the candidate cells for the reselection. For example, reference signal received power (RSRP) is used as the result of the measurement of the radio quality. For example, the best cell is the cell whose evaluation value is the highest based on the result of the measurement of the radio quality and other types of information (for example, an offset value).

In selecting the best cell, the terminals 301, 303, and 304 each uses at least one of the barring probability and the connection barring time period of each of the candidate cells for the reselection, in addition to the result of the measurement of the radio quality. The barring probability and the connection barring time period of each of the candidate cells for the reselection can be acquired from the barring probability list 350.

In the example depicted in FIG. 3, as a result of the cell reselection, the terminal 301 changes the connection destination to the small cell 323. As a result of the cell reselection, the terminal 303 changes the connection destination to the small cell 322. As a result of the cell reselection, the terminal 304 changes the connection destination to the macro cell 312.

The first wireless communications apparatus 110 depicted in FIG. 1 can be realized by, for example, each of the base stations forming the macro cells 311 and 312, and the small cells 321 to 326. The second wireless communications apparatus 120 depicted in FIG. 1 can be realized by, for example, each of the terminals 301 to 306.

Figure 4:
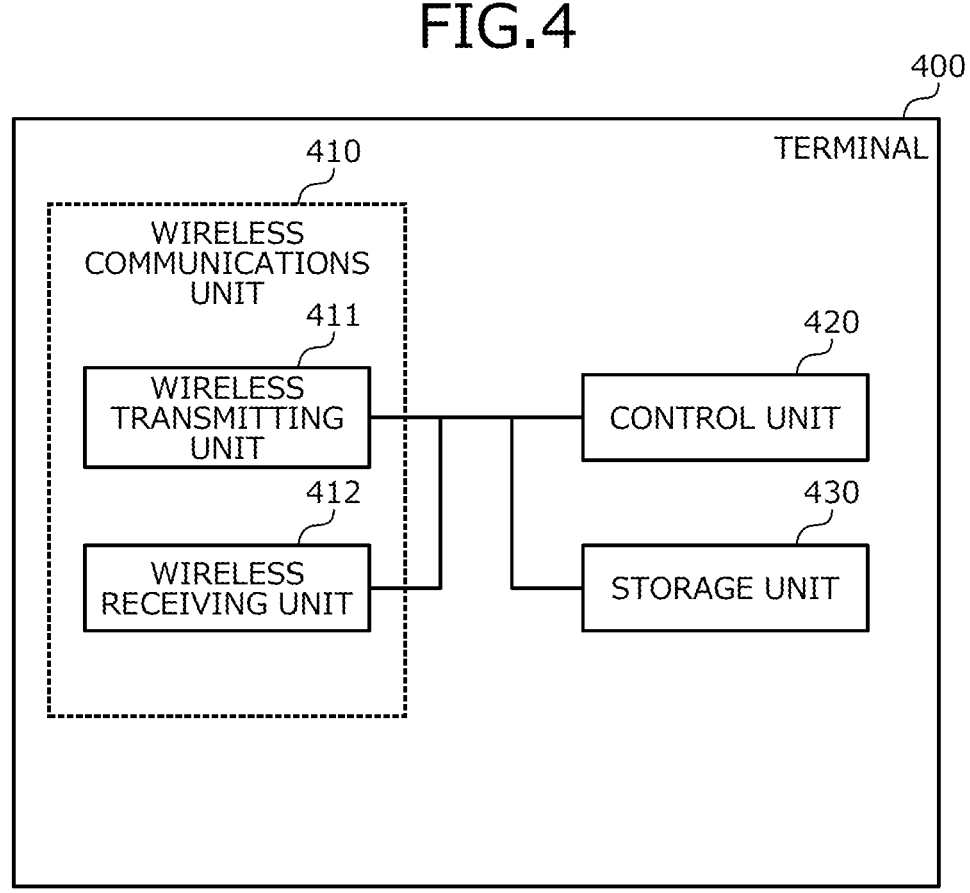
FIG. 4 is a diagram of an example of a terminal according to the second embodiment.

FIG. 4 is a diagram of an example of the terminal according to the second embodiment. The terminals 301 to 306 depicted in FIG. 3 can each be realized by, for example, a terminal 400 depicted in FIG. 4. The terminal 400 includes a wireless communications unit 410, a control unit 420, and a storage unit 430. The wireless communications unit 410 includes a wireless transmitting unit 411 and a wireless receiving unit 412. These structures are configured so as to be connected with each other such that the structures can input and output a signal or data in one direction or two directions.

The wireless transmitting unit 411 transmits user data and a control signal through an antenna by wireless communication. The radio signal transmitted by the wireless transmitting unit 411 can include arbitrary user data, arbitrary control information, and the like (for which encoding, modulation, or the like has been performed). The wireless receiving unit 412 receives the user data and the control signal through an antenna by wireless communication. The radio signal received by the wireless receiving unit 412 can include arbitrary user data, an arbitrary control signal, and the like (for which encoding, modulation, or the like has been performed). The antenna may be commonly used for transmission and reception.

The control unit 420 outputs to the wireless transmitting unit 411, the user data and the control signal to be transmitted to another wireless station. The control unit 420 acquires the user data and the control signal received by the wireless receiving unit 412. The control unit 420 inputs and outputs with respect to the storage unit 430 described later, the user data, the control information, a program, and the like. The control unit 420 inputs and outputs with respect to the wireless communications unit 410, user data and a control signal transmitted to and received from other communications apparatuses, and the like. In addition, the control unit 420 executes various types of control in the terminal 400. The storage unit 430 stores therein various types of information such as the user data, the control information, a program, and the like.

The control unit 121 of the second wireless communications apparatus 120 depicted in FIG. 1 can be realized by, for example, the control unit 420.

Figure 5:
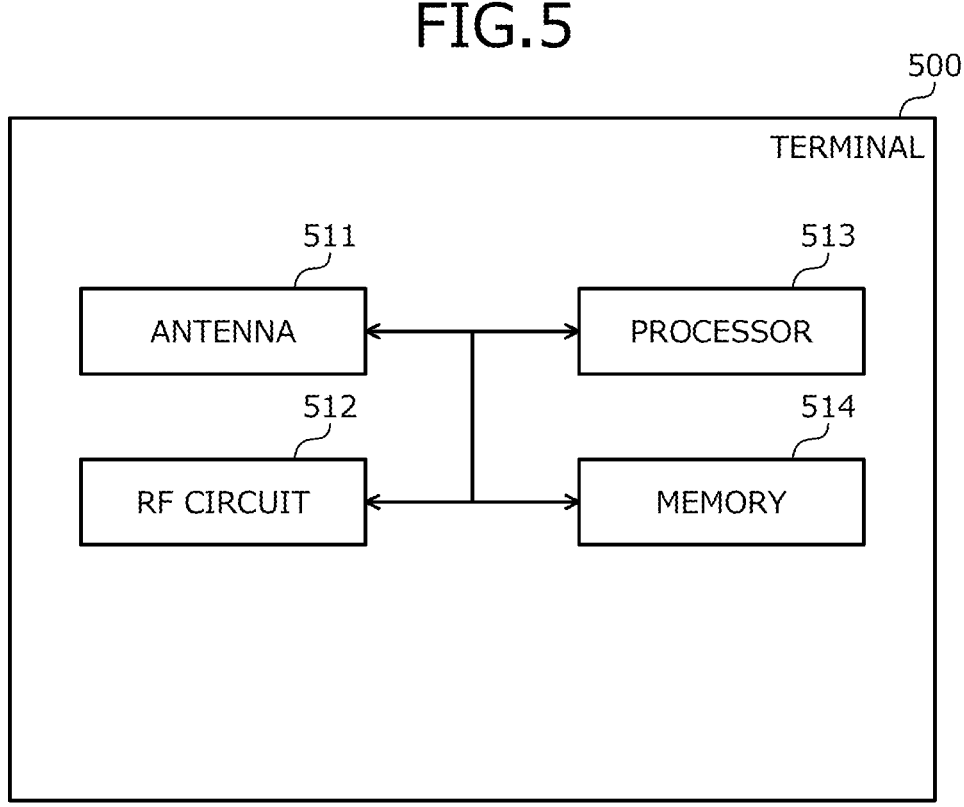
FIG. 5 is a diagram of an example of a hardware configuration of the terminal according to the second embodiment.

FIG. 5 is a diagram of an example of a hardware configuration of the terminal according to the second embodiment. The terminal 400 depicted in FIG. 4 can be realized by, for example, a terminal 500 depicted in FIG. 5. The terminal 500 includes, for example, an antenna 511, an RF circuit 512, a processor 513, and a memory 514. These components are connected with each other to be able to input and output various types of signals and data through, for example, a bus.

The antenna 511 includes a transmitting antenna that transmits a radio signal and a receiving antenna that receives a radio signal. The antenna 511 may be a common antenna that transmits and receives radio signals. The RF circuit 512 executes a radio frequency (RF) process for a signal received by the antenna 511 and a signal transmitted by the antenna 511. The RF process includes, for example, frequency conversion between a baseband and an RF band.

The processor 513 is, for example, a central processing unit (CPU) or a digital signal processor (DSP). The processor 513 may be realized by a digital electronic circuit such as an application specific integrated circuit (ASIC), a field programmable gate array (FPGA), or a large scale integration (LSI).

The memory 514 can be realized by, for example, a random access memory (RAM) such as a synchronous dynamic random access memory (SDRAM), a read only memory (ROM), or a flash memory. The memory 514 stores therein, for example, the user data, the control information, and the program.

The wireless communications unit 410 depicted in FIG. 4 can be realized by, for example, the antenna 511 and the RF circuit 512. The control unit 420 depicted in FIG. 4 can be realized by, for example, the processor 513. The storage unit 430 depicted in FIG. 4 can be realized by, for example, the memory 514.

Figure 6:
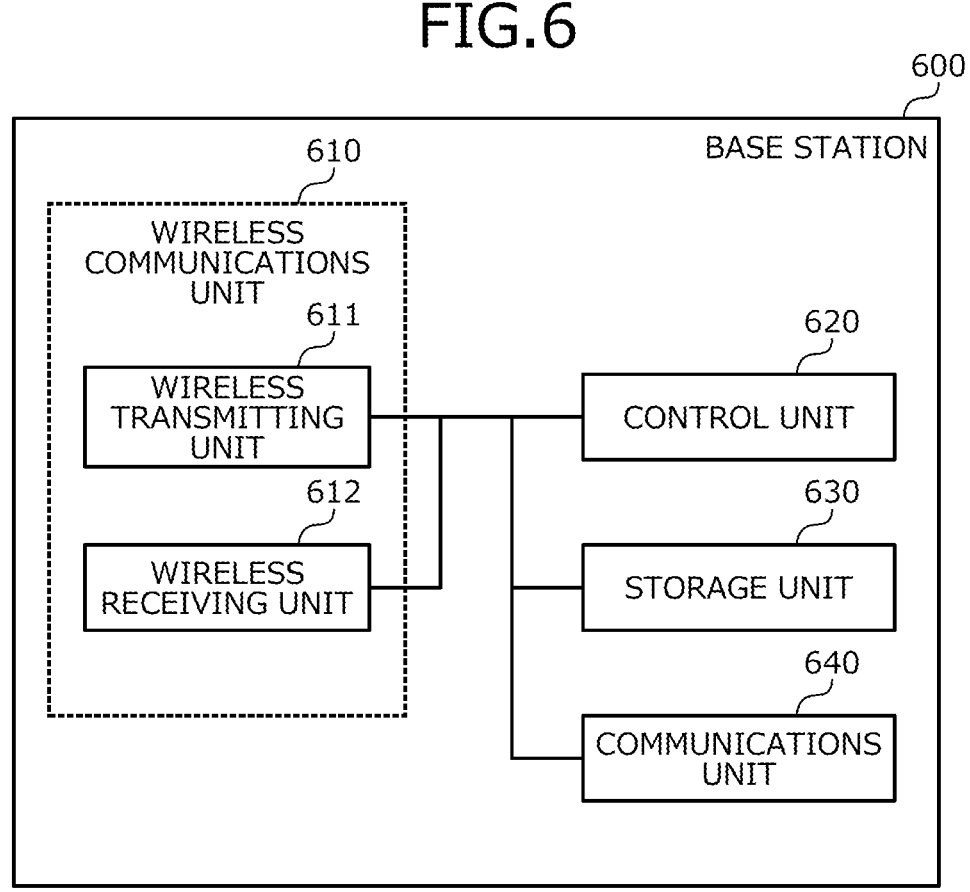
FIG. 6 is a diagram of an example of a base station according to the second embodiment.

FIG. 6 is a diagram of an example of a base station according to the second embodiment. The base stations forming the macro cells 311 and 312, and the small cells 321 to 326 depicted in FIG. 3 can each be realized by, for example, a base station 600 depicted in FIG. 6. As depicted in FIG. 6, the base station 600 includes, for example, a wireless communications unit 610, a control unit 620, a storage unit 630, and a communications unit 640. The wireless communications unit 610 includes a wireless transmitting unit 611 and a wireless receiving unit 612. These components are connected with each other such that the components can input and output a signal or data unidirectionally or bi-directionally.

The wireless transmitting unit 611 transmits the user data and the control signal through the antenna by wireless communication. The radio signal transmitted by the wireless transmitting unit 611 can include arbitrary user data, arbitrary control information, and the like (for which encoding, modulation, or the like has been performed). The wireless receiving unit 612 receives the user data and the control signal through the antenna by wireless communication. The radio signal received by the wireless receiving unit 612 can include arbitrary user data, arbitrary control signal, and the like (for which encoding, modulation, or the like has been performed). The antenna may be commonly used for transmission and reception.

The control unit 620 outputs to the wireless transmitting unit 611, user data and a control signal to be transmitted to another wireless station. The control unit 620 acquires user data and a control signal received by the wireless receiving unit 612. The control unit 620 inputs and outputs with respect to the communications unit 630, user data, control information, a program, and the like. The control unit 620 inputs and outputs with respect to the storage unit 640 described later, user data and a control signal to be transmitted to and/or received from other communications apparatuses and the like. In addition, the control unit 620 executes various types of control in the base station 600.

The storage unit 630 stores therein various types of information such as the user data, the control information, the program, and the like. The communications unit 640 transmits and receives with respect to other communications apparatuses, the user data and the control signal using, for example, wire-based signals. An interface between base stations used to collect the information indicating the barring probability and the connection barring time period can be realized by, for example, the communications unit 640.

The control unit 111 of the first wireless communications apparatus 110 depicted in FIG. 1 can be realized by, for example, the control unit 620. The transmitting unit 112 of the first wireless communications apparatus 110 depicted in FIG. 1 can be realized by, for example, the wireless transmitting unit 611 and the control unit 620.

Figure 7:
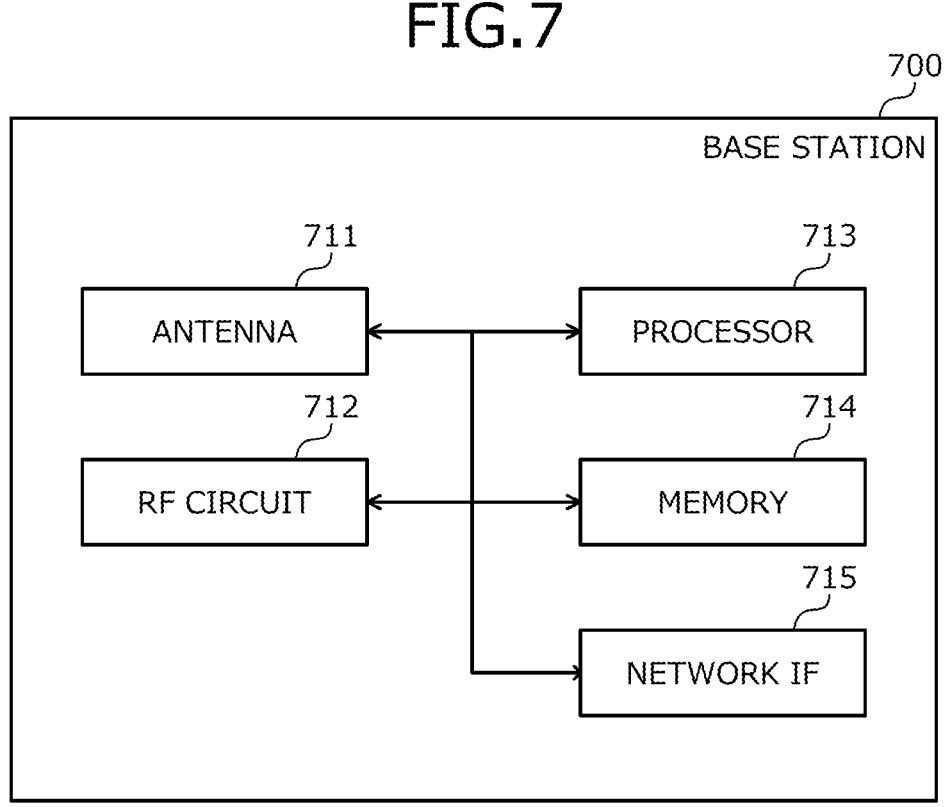
FIG. 7 is a diagram of an example of a hardware configuration of the base station according to the second embodiment.

FIG. 7 is a diagram of an example of a hardware configuration of the base station according to the second embodiment. The base station 600 depicted in FIG. 6 can be realized by, for example, a base station 700 depicted in FIG. 7. The base station 700 includes an antenna 711, an RF circuit 712, a processor 713, a memory 714, and a network IF 715. These components are connected with each other to be able to input and output various types of signal and data through, for example, a bus.

The antenna 711 includes a transmitting antenna that transmits a radio signal, and a receiving antenna that receives a radio signal. The antenna 711 may be a common antenna that transmits and receives radio signals. The RF circuit 712 executes an RF process for a signal received by the antenna 711 and a signal transmitted by the antenna 711. The RF process includes, for example, frequency conversion between a baseband and an RF band.

The processor 713 is, for example, a CPU, a DSP, or the like. The processor 713 may be realized by a digital electronic circuit such as an ASIC, an FPGA, an LSI, or the like.

The memory 714 can be realized by, for example, a RAM such as an SDRAM, a ROM, or a flash memory. The memory 714 stores therein, for example, the user data, the control information, and the program.

The network IF 715 is a communication interface that executes wired communication with, for example, a network. The network IF 715 may include, for example, an Xn interface to execute wired communication between the base stations.

The wireless communications unit 610 depicted in FIG. 6 can be realized by, for example, the antenna 711 and the RF circuit 712. The control unit 620 depicted in FIG. 6 can be realized by, for example, the processor 713. The storage unit depicted in FIG. 6 can be realized by, for example, the memory 714. The communications unit 640 depicted in FIG. 6 can be realized by, for example, the network IF 715.

Figure 8:
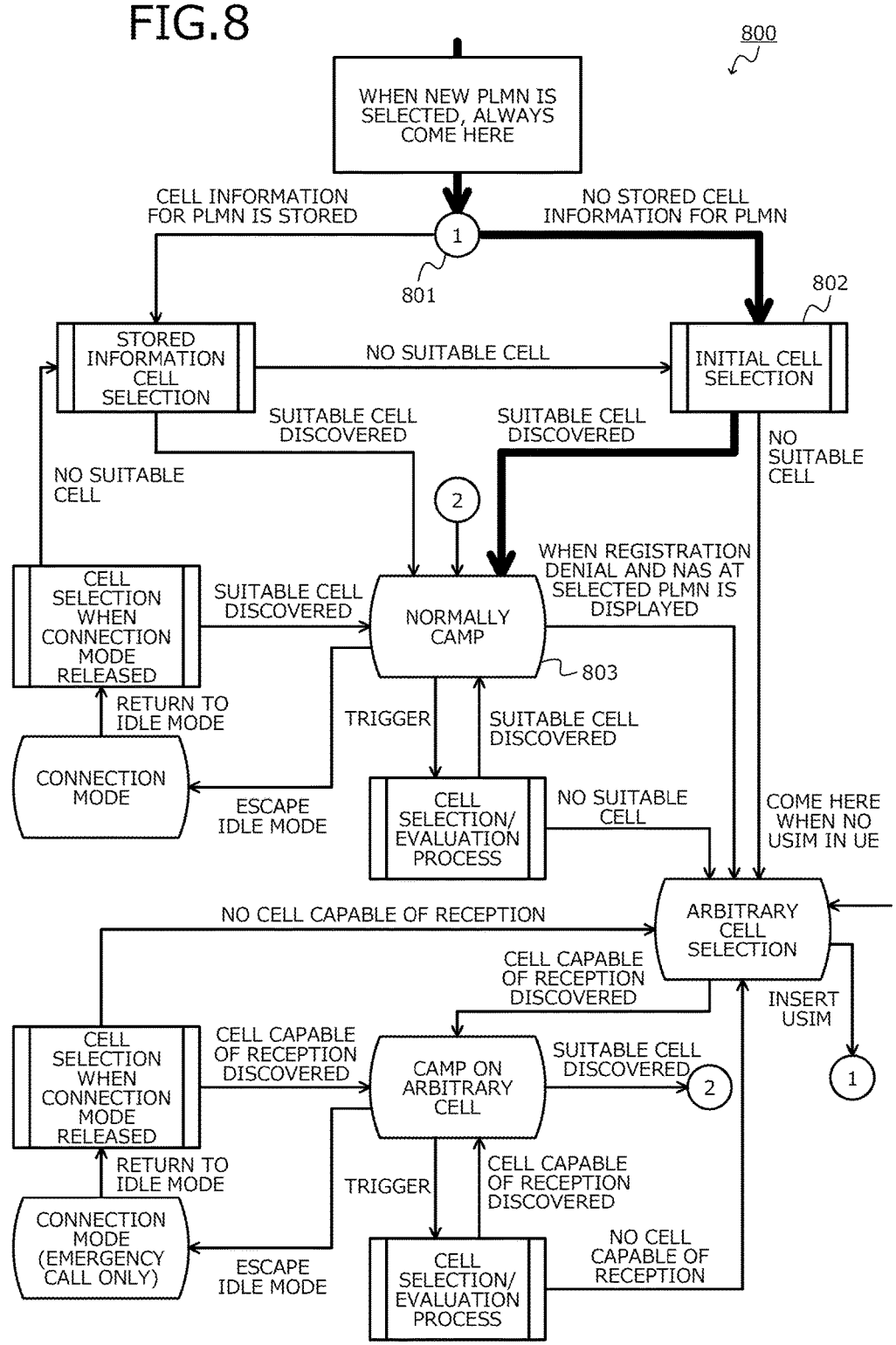
FIGS. 8, 9, and 10 are diagrams of an example of cell selection and cell reselection in an idle mode of the terminal according to the second embodiment.
Figure 9:
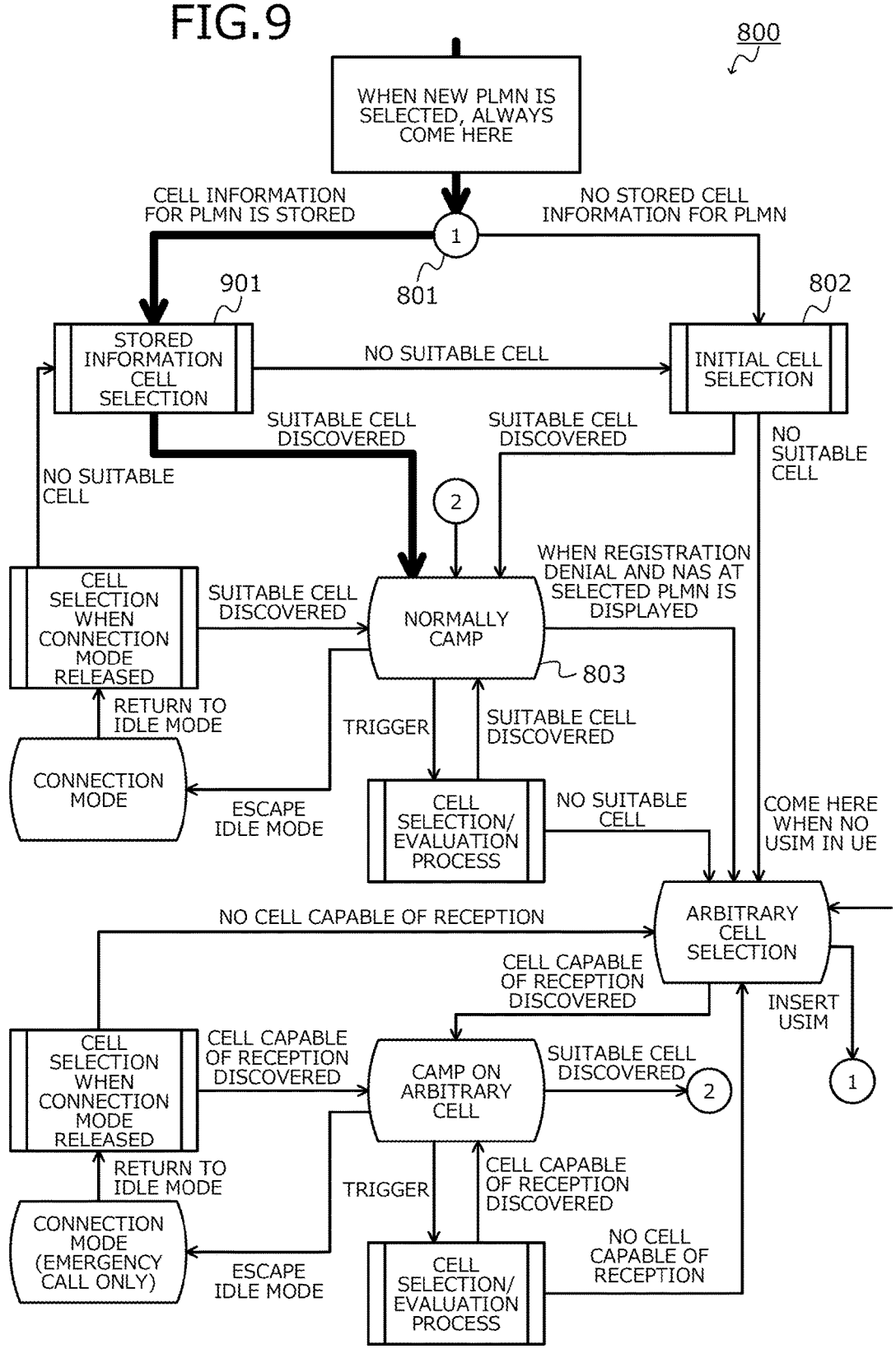
Figure 10:
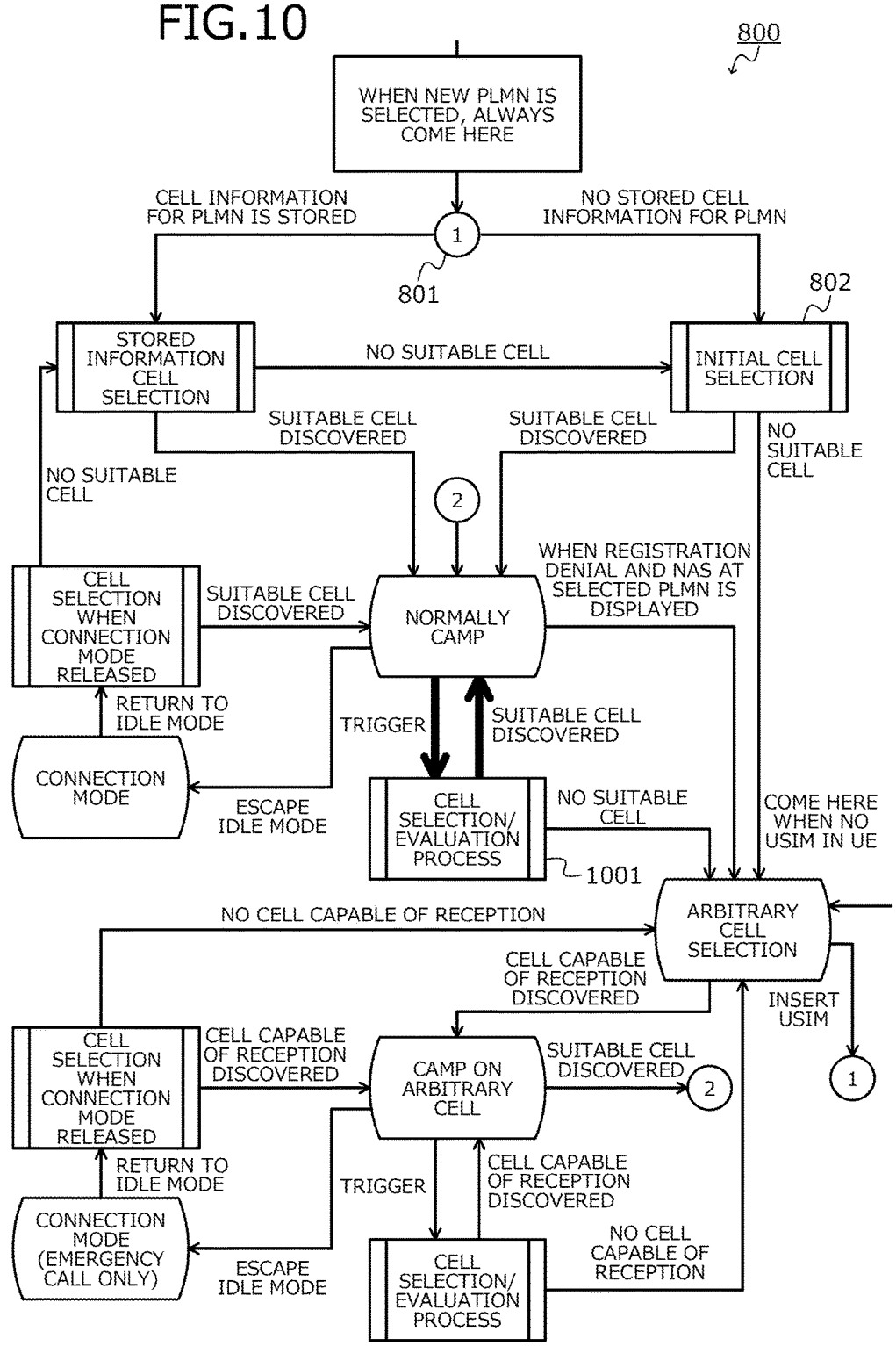

FIGS. 8, 9, and 10 are diagrams of an example of cell selection and cell reselection in the idle mode of the terminal according to the second embodiment. A state transition/procedure 800 depicted in each of FIGS. 8 to 10 represents the state transition and a procedure for the cell selection and the cell reselection in the idle mode of the terminal 400 according to the second embodiment.

For example, a state transition and a procedure for the cell selection and the cell reselection in the idle mode specified in TS25.304 of the 3GPP are applicable to the state transition/procedure 800. The terminal 400 transitions to a state 801 when the terminal 400 selects a New Public Land Mobile Network (PLMN).

For example, when cell information stored about the selected PLMN is not present, the state of the terminal 400 transitions as indicated by a thick arrow in FIG. 8, from the state 801 to execute initial cell selection 802. When the terminal 400 discovers a suitable cell by the initial cell selection 802, the terminal 400 establishes a connection to the suitable cell to be in a state of normally camping 803 (Camped Normally). The normally camping 803 is the state where the terminal 400 is connected to (camped on) the suitable cell discovered by the terminal 400.

When stored cell information regarding the selected PLMN is present, the state of the terminal 400 transitions as indicated by a thick arrow in FIG. 9, from the state 801 and executes stored information cell selection 901 to select a cell based on the stored cell information. When the terminal 400 discovers a suitable cell by the stored information cell selection 901, the terminal 400 establishes a connection to the suitable cell to be in the state of the normally camped 803.

When a trigger of the cell reselection occurs in the normally camped 803 state, the state of the terminal 400 transitions as indicated by a thick arrow in FIG. 10 and executes a cell reselection evaluation process 1001. When the terminal 400 discovers a suitable cell by the cell reselection evaluation process 1001, the terminal 400 establishes a connection to the suitable cell and returns to the normally camped 803 state. The trigger for the cell reselection is a cycle that is periodically generated, for example.

FIG. 11 is a flowchart of an example of a process by the terminal according to the second embodiment. For example, the terminal 400 according to the second embodiment executes the steps depicted in FIG. 11. The terminal 400 receives the notification signal from the cell on which the terminal 400 camps (step S1101). The terminal 400 determines whether the ACB is performed in the cell on which the terminal 400 camps (step S1102). The determination at step S1102 can be executed based on the information included in the notification signal received at, for example, step S1101.

In a case where the terminal 400 determines at step S1102 that ACB is not performed (step S1102: NO), the terminal 400 causes the series of process steps to come to an end. In a case where the terminal 400 determines that the ACB is performed (step S1102: YES), the terminal 400 acquires the barring probability list included in the notification signal received at step S1101 (step S1103). The barring probability list is information that indicates, for example, the barring probability in the cell on which the terminal 400 camps and the barring probability of each of the neighbor cells of the cell on which the terminal 400 camps.

The terminal 400 determines whether the random numeric value calculated by the terminal 400 is smaller than the barring probability of the cell on which the terminal 400 camps (step S1104). The barring probability of the cell on which the terminal 400 camps can be acquired from the barring probability list acquired at, for example, step S1103.

In a case where the terminal 400 determines at step S1104 that the random numeric value is equal to or greater than the barring probability (step S1104: NO), the terminal 400 determines that the terminal 400 is not to be barred and causes the series of process steps to come to an end. In a case where the terminal 400 determines that the random numeric value is smaller than the barring probability (step S1104: YES), the terminal 400 determines that the terminal 400 is to be barred. In this case, the terminal 400 selects the best cell from the cells whose random numeric values calculated by the terminal 400 are smaller than the barring probability and camps on the selected best cell (step S1105) whereby the series of process steps to come to an end.

At step S1105, for example, the terminal 400 determines the cells indicated in the barring probability list that is included in the notification signal, to be the candidate cells for the cell reselection destination, and acquires the barring probability indicated by the notification signal for each of the candidate cells for the cell reselection destination. The candidates for the cell reselection destination may include the cell on which the terminal 400 currently camps or may not include the cell on which the terminal 400 currently camps.

The terminal 400 compares the random numeric value calculated by the terminal 400 and the barring probability indicated by the notification signal with each other for each of the candidate cells for the cell reselection destination. The random numeric value used at step S1105 may be the random numeric value calculated for each of the candidate cells for the cell reselection destination or may be the common random numeric value calculated for the candidate cells for the cell reselection destination. The random numeric value used at step S1105 may be the same random numeric value as the random numeric value used at step S1104.

The terminal 400 selects the best cell from the cells whose random numeric values are each smaller than the barring probability of the candidate cells for the cell reselection destination, and camps on the selected best cell. For example, the terminal 400 selects the cell having the highest radio quality (for example, RSRP) for the terminal 400 of the cells whose random numeric values are each smaller than the barring probability, to be the best cell. Thus, the probability is increased for the terminal 400 to change the connection destination to a cell whose barring probability is high, that is, whose barring degree is low, and the load among the cells can be distributed.

The method of selecting the best cell is however not limited hereto and various types of methods may be employed. For example, the terminal 400 may select the cell whose barring probability is highest (whose barring degree is lowest) of the cells whose random numeric values are each smaller than the barring probability, to be the best cell. Alternatively, the terminal 400 may select the best cell by ranking the cells whose random numeric values are each smaller than the barring probability based on the radio quality for the terminal 400 and the barring probabilities, and making a selection based on the result of the ranking. In this case, selection of a cell whose radio quality is higher for the terminal 400 as the best cell is facilitated. In addition, selection of a cell whose barring probability is higher (whose barring degree is lower) as the best cell is facilitated.

For example, the terminal 400 calculates the reference value according to equation (1) below for each of the cells whose random numeric values are each smaller than the barring probability, and selects the cell whose calculated reference value is the highest to be the best cell. "A" and "B" in equation (1) below are coefficients each greater than 0.

$$\text{Reference value} = A \times \text{radio quality} + B \times \text{barring probability} \quad (1)$$

In the selection of the best cell, the connection barring time period may be used instead of the barring probability. In this case, selection of a cell whose connection barring time period is shorter (whose barring degree is lower) as the best cell is facilitated. For example, the terminal 400 calculates the reference value according to equation (2) below for each of the cells whose random numeric values are each lower than the barring probability, and selects the cell whose calculated reference value is the highest to be the best cell. "C" in equation (2) below is a coefficient greater than 0.

$$\text{Reference value} = A \times \text{radio quality} - C \times \text{connection barring time period} \quad (2)$$

In the selection of the best cell, both the barring probability and the connection barring time period may be used. For example, the terminal 400 calculates the reference value according to equation (3) below for each of the cells whose random numeric values are each smaller than the barring probability, and selects the cell whose calculated reference value is the highest to be the best cell.

$$\text{Reference value} = A \times \text{radio quality} + B \times \text{barring probability} - C \times \text{connection barring time period} \quad (3)$$

While a case where the best cell is selected from the cells whose random numeric value are each smaller than the barring probability has been described, the best cell may be selected based on the barring degree by the ACB from the cells indicated in the barring probability list. For example, the terminal 400 calculates the reference value according to any one of equations (1) to (3) for each cell indicated in the barring probability list and selects the cell whose calculated reference value is the highest to be the best cell.

As described with reference to FIG. 11, when the terminal 400 is to be barred, the terminal 400 can execute the cell reselection using the barring degree of the cells indicated in the barring probability list. The probability for the terminal 400 to change the connection destination to a cell whose barring degree is low, that is, whose load is small can thereby be increased and the load among the cells can be distributed.

As described, according to the second embodiment, when the connection to the cell to be the connection destination is barred, the terminal 400 executes the cell reselection (the reselection) according to the values of the barring probability and the connection barring time period of the ACB in at least one or more cells. The terminal 400 camps on the best cell selected by the cell reselection.

Thus, switching from the cell to which connection is barred to another cell can be executed, the load of the cell to which connection is barred is reduced, and load imbalances between the cells can be resolved. Impact on the system can be suppressed because load imbalances between the cells can be resolved without, for example, configuring any selection probability or any priority in each of the cells by executing the cell reselection using the values of the barring probability and the connection barring time period of the ACB.

For example, in the system design, load imbalances between the cells can be resolved without adding any selection probability and any priority as parameters for the cells and without adding a process of calculating selection probability and/or priority for each of the cells.

While a case where the terminal 400 executes the cell reselection (the reselection) has been described, this embodiment is applicable to a case where the terminal 400 executed the cell selection (the selection). Thus, the possibility of the connection to be established with a cell different from a cell to which connection is barred can be increased. The load of the cell to which connection is barred can be reduced and load imbalances between the cells can be resolved.

The third embodiment will be described for the parts that differ from the second embodiment. This embodiment can also be understood as Example that further embodies the first embodiment and therefore, can be implemented in combination with the first embodiment. This embodiment can be combined with the second embodiment as described later.

FIG. 12 is a diagram of an example of cell reselection in a wireless communications system according to the third embodiment. In FIG. 12, parts similar to those depicted in FIG. 3 will be given the same reference numerals used in FIG. 3 and will not again be described. Each of the small cells 326, 322, and 323 (SC6, SC2, and SC3), and the macro cell 312 (MC2) configures Qoffset_temp to calculate the reference value of the cell in the cell reselection.

Qoffset_temp is configured according to the load state of the cell. For example, a technique specified in TS36.331 of the 3GPP is applicable to the configuration of Qoffset_temp. For example, Qoffset_temp is configured to be larger as the load of the cell is larger. Qoffset_temp is control information corresponding to the degree of the barring of the connection. For example, the cell having Qoffset_temp configured therein to be large has a low reference value calculated for the cell reselection whereby the cell is not likely to be selected as the best cell.

The small cell 326 gives notification of an offset list 1210 using a notification signal transmitted in the small cell 326. The offset list 1210 is information indicating Qoffset_temp of the small cell 326 and Qoffset_temp of each of the small cells 322 and 323, and the macro cell 312 that are neighbor cells of the small cell 326. Qoffset_temp of each of the small cells 326, 322, and 323 (SC6, SC2, and SC3) and the macro cell 312 (MC2) is configured in the example depicted in FIG. 12 such that the barring probabilities of the small cells 326, 322, and 323, and the macro cell 312 are respectively 70%, 10%, 30%, and 40%.

For example, the base station forming the small cell 326 can generate the offset list 1210 by collecting information indicating Qoffset_temp from each of the base stations forming the small cells 322 and 323, and the macro cell 312. For the collection of the information indicating Qoffset_temp, for example, an interface between base stations between the small cell 326 and the other base stations (for example, the X2 interface) can be used.

The terminals 301 to 306 each compares the calculated random numeric value and the barring probability in the small cell 326 to which the terminal are currently connected. In the example depicted in FIG. 12, it is assumed that the random numeric value is equal to or greater than the barring probability of the small cell 326 for the terminals 301, 303, and 304 among the terminals 301 to 306; and the terminals 301, 303, and 304 are to be barred.

In this case, the terminals 301, 303, and 304 to be barred each executes the cell reselection to reselect a cell to be the connection destination. In this case, the terminals 301, 303, and 304 each selects the best cell by ranking the candidate cells for the reselection based on the measurement result of the radio quality (for example, RSRP) for each of the candidate cells for reselection.

In selecting the best cell, the terminals 301, 303, and 304 each uses Qoffset_temp indicated in the offset list 1210 for each of the candidate cells for the reselection in addition to the measurement result of the radio quality.

In the example depicted in FIG. 12, as a result of the cell reselection, the terminal 301 changes the connection destination to the small cell 323. As a result of the cell reselection, the terminal 303 changes the connection destination to the small cell 322. As a result of the cell reselection, the terminal 304 changes the connection destination to the macro cell 312.

FIG. 13 is a flowchart of another example of the process executed by the terminal according to the third embodiment. The terminal 400 according to the third embodiment executes the steps depicted in, for example, FIG. 13. The terminal 400 receives a notification signal from the cell on which the terminal 400 camps (step S1301). The terminal 400 determines whether ACB is conducted in the cell on which the terminal 400 camps (step S1302). The determination at step S1302 can be executed based on, for example, the information included in the notification signal received at step S1301.

In a case where the terminal 400 determines at step S1302 that no ACB is conducted (step S1302: NO), the terminal 400 causes the series of process steps to come to an end. In a case where the terminal 400 determines that the ACB is conducted (step S1302: YES), the terminal 400 acquires the offset list included in the notification signal received at step S1301 (step S1303). The offset list is information that indicates, for example, Qoffset_temp of the cell on which the terminal 400 camps and Qoffset_temp of each of the neighbor cells of the cell on which the terminal 400 camps.

The terminal 400 determines whether the random numeric value calculated by the terminal 400 is smaller than the barring probability of the cell on which the terminal 400 camps (step S1304). The barring probability of the cell on which the terminal 400 camps can be acquired from, for example, notification signal received at step S1301. In a case where the terminal 400 determines that the random numeric value is equal to or greater than the barring probability (step S1304: NO), the terminal 400 determines that the terminal 400 is not to be barred, and causes the series of process steps to come to an end.

In a case where the terminal 400 determines at step S1304 that the random numeric value is smaller than the barring probability (step S1304: YES), the terminal 400 determines that the terminal 400 is to be barred. In this case, the terminal 400 calculates the reference value by multiplying the measurement result of the radio quality of each of the candidate cells for the cell reselection by Qoffset_temp, for the cell (step S1305).

The terminal 400 selects the best cell based on the reference value calculated at step S1305 and camps on the selected best cell (step S1306) and causes the series of process steps to come to an end.

For example, in the cell reselection, the terminal 400 calculates R(s) and R(n) represented by equation (4) below as cell selection reference values. "R(s)" is the cell selection reference value for the cell on which the terminal 400 camps (a serving cell). "R(n)" is a cell selection reference value for a neighbor cell of the terminal 400 and different from the serving cell (a neighbor cell).

$$R(s)=Q(\text{meas's})+Q(\text{Hyst})-Q\text{offset\_temp } R(n)=Q(\text{meas's})+Q\text{offset}-Q\text{offset\_temp} \quad (4)$$

"Q(meas's)" is an RSRP measured by the terminal 400. "Q(Hyst)" is a hysteresis value notified by the notification signal in the cell. "Qoffset" is an offset value between the cells. "Qoffset_temp" is an offset value temporarily applied to the cell. As an example, Qoffset_temp can be set to be in a range of 0 to 15 [dB].

The terminal 400 calculates R(s) in equation (4) for the serving cell as the cell selection reference value, and calculates R(n) in equation (4) for the neighbor cell as the cell selection reference value. In this case, the terminal 400 also configures Qoffset_temp of R(n) of the neighbor cell in addition to Qoffset_temp of R(s) of the serving cell, using the offset list notified from the serving cell. The terminal 400 selects the cell whose calculated cell selection reference value is the highest, to be the best cell.

In the cell reselection, a cell having priority higher than that of the serving cell configured therein and at a frequency different from that of the serving cell may be selected or a cell based on a different radio access technology (RAT) may be selected. In the cell reselection, a cell having a priority equal to that of the serving cell and at a frequency different from that of the serving cell may be selected or a cell at a frequency equal to that of the serving cell and formed by a base station different from that of the serving cell may be selected.

As described with reference to FIG. 12, the terminal 400 executes the cell reselection when the terminal 400 is to be barred. The terminal 400 applies an offset configured for each of the cells based on the offset list, to the reference value calculated for each of the cells, for the cell reselection. The probability for the terminal 400 to change the connection destination to a cell whose barring degree is low, that is, whose load is small can thereby be increased and the load among the cells can be distributed.

As described, according to the third embodiment, when the connection to the cell to be the connection destination is barred for the terminal 400, the terminal 400 executes the cell reselection (the reselection) according to Qoffset_temp of the at least one or more cells. The terminal 400 camps on the best cell selected by the cell reselection.

Thus, the switching from a cell whose connection is barred to another cell is executed whereby the load of the cell whose connection is barred can be reduced and load imbalances between cells can be resolved. By executing the cell reselection using Qoffset_temp, impact on the system can be suppressed because load imbalances between the cells can be resolved even without configuring, for example, the selection probability or the priority for each cell.

For example, in the system design, load imbalances between the cells can be resolved without adding any selection probability or any priority as parameters for each of the cells and without adding any process of calculating the selection probability or the priority for each of the cells.

While a case where the terminal 400 executes the cell reselection (the reselection) has a described, this embodiment is also applicable to the case where the terminal 400 executes the cell selection (the selection). For example, the terminal 400 selects a cell satisfying equation (5) below as the cell to be the connection destination (a suitable cell or an acceptable cell).

$$Srxlev > 0 \text{ AND } Squal > 0 \text{ where:} \quad (5)$$
$$Srxlev = Q(rxlevmeas) - (Q(rxlevmin) + Q(rxlevminoffset)) -$$
$$Pcompensation - \text{Qoffset\_temp}$$
$$Squal = Q(qualmeas) -$$
$$(Q(qualmin) + Q(qualminoffset)) - \text{Qoffset\_temp}$$

In equation (5), "Q(rxlevmeas)" is the measurement result (for example, RSRP) of the reception level. Q(rxlevmin) is the lowest reception level [dBm] necessary in the cell. "Q(rxlevminoffset)" is an offset in relation to Q(rxlevmin). "Pcompensation" is a compensation value in relation to the uplink transmission power capacity of the terminal. "Qoffset_temp" is an offset value temporarily applied to the cell. For example, Qoffset_temp can be configured to be in a range of 0 to 15 [dB].

"Q(qualmeas)" is the measurement result of the reception quality of, for example, the reference signal received quality (RSRQ). "Q(qualmin)" is the lowest reception quality [dB] necessary in the cell. "Q(qualminoffset)" is an offset in relation to Q(qualm in).

When the terminal 400 executes the cell selection, the terminal 400 sets Qoffset_temp in equation (5) for each of the candidate cells to be the connection destination using the offset list notified. Thus, the possibility is increased for connection to be established with a cell different from a cell whose connection is barred. The load of a cell whose connection is barred can therefore be reduced and load imbalances between cells can be resolved.

As described, according to the wireless communications apparatus, the wireless communications system, and the wireless communications method, load imbalances between cells can be resolved, suppressing the impact on the system.

The time period up to the restarting of the communication of a terminal can be reduced by executing the cell reselection when the terminal is to be barred in the cell to be the connection destination, compared to a case where, for example, the terminal stands by for a time period based on the connection barring time period in a cell that is the connection destination.

A cell having a small load can be selected as a new connection destination by using the control information corresponding to the degree of the barring in each of the candidate cells for the cell reselection when the cell reselection is executed. For example, when load imbalances between the cells occur, the time period up to the time when the non-uniformity is resolved can be reduced.

The embodiments can be implemented in combination. For example, each of the base stations may give notification of both the barring probability list 350 (see, for example, FIG. 3) and the offset list 1210 (see, for example, FIG. 12). In this case, the terminals each execute the cell selection and the like using at least the barring probability list 350 or the offset list 1210. For example, at step S1105 depicted in FIG. 11 in relation to the second embodiment, when the cell on which the terminal currently camps is again selected (reselected) as the best cell, the terminal may move to the selected best cell according to the third embodiment.

According to one aspect of the present invention, an effect is achieved in that suppressing the impact on the system and load imbalances between the cells can be resolved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communications apparatus comprising:
    a memory that stores a plurality of instructions; and
    a processor circuit coupled to the memory and configured to execute the instructions to:
        establish a connection with a first cell formed by another wireless communications apparatus, and
        receive control information including at least one of a barring probability and a connection barring time period in connection barring of one or more cells, the processor circuit performing selection or reselection of a second cell different from the first cell, according to a value obtained by adding the barring probability to and subtracting the connection barring time period from a radio quality of each of the one or more cells, when the connection with the first cell is barred, wherein the wireless communications apparatus camps on the second cell, not on the first cell when the processor circuit performs the selection or reselection of the second cell.

2. The wireless communications apparatus according to claim 1, wherein the one or more cells include a cell that is different from the first cell.

3. The wireless communications apparatus according to claim 1, wherein
    the control information corresponding to a degree of the connection barring of the one or more cells is a reference value calculated for the one or more cells for the selection or the reselection, the control information including an offset value for the reference value based on a measurement result of radio quality of the one or more cells.

4. The wireless communications apparatus according to claim 1, wherein
    the control information corresponding to a degree of the connection barring of the one or more cells is included in a notification signal transmitted by the first cell.

5. A wireless communications apparatus comprising:
    a memory that stores a plurality of instructions;
    a processor circuit coupled to the memory and configured to execute the instructions
        to bar connection with a cell formed by the wireless communications apparatus; and
    a transmitter configured to transmit a notification signal that includes control information comprising at least one of a barring probability and a connection barring time period in connection barring of one or more cells, the one or more cells including a cell different from the cell formed by the wireless communications apparatus, wherein selection or reselection of the one or more cells is determined according to a value obtained by adding the barring probability to and subtracting the connection barring time period from a radio quality of each of the one or more cells.

6. A wireless communications system comprising:
    a first wireless communications apparatus that forms a first cell; and
    a second wireless communications apparatus that establishes a connection with the first cell and receives control information including at least one of a barring probability and a connection barring time period in connection barring of one or more cells, the second wireless communications apparatus executing selection or reselection of a second cell different from the first cell according to a value obtained by adding the barring probability to and subtracting the connection barring time period from a radio quality of each of the one or more cells, when the connection with the first cell is barred, the second wireless communications apparatus camping on the second cell, not on the first cell, when the second wireless communications apparatus executes the selection or the reselection of the second cell.

7. A wireless communications method by a wireless communications apparatus that establishes a connection with a first cell formed by another wireless communications apparatus, the method comprising:
    receiving control information including at least one of a barring probability and a connection barring time period in connection barring of one or more cells;
    executing selection or reselection of a second cell different from the first cell according to a value obtained by adding the barring probability to and subtracting the connection barring time period from a radio quality of each of the one or more cells when the connection with the first cell is barred; and
    camping on the second cell, not on the first cell, when the selection or the reselection of the second cell is performed.

8. A wireless communications method by a wireless communications apparatus forming a cell, the method comprising:
    acquiring control information including at least one of a barring probability and a connection barring time period in connection barring of one or more cells, the one or more cells including a cell different from the cell formed by the wireless communications apparatus; and
    transmitting a notification signal that includes the acquired control information, when a connection with the cell formed by the wireless communications apparatus is barred, wherein selection or reselection of the one or more cells is determined according to a value obtained by adding the barring probability to and subtracting the connection barring time period from a radio quality of each of the one or more cells.

* * * * *